Feb. 19, 1952 G. G. ERLAND ET AL 2,586,630
BOOSTER APPARATUS FOR CONVEYER DRIVES
Filed March 21, 1949 3 Sheets-Sheet 1

Inventors:
GUSTAVE G. ERLAND and
AXEL B. PEARSON,
by: Donald G. Dalton
their Attorney.

Feb. 19, 1952     G. G. ERLAND ET AL     2,586,630
BOOSTER APPARATUS FOR CONVEYER DRIVES

Filed March 21, 1949     3 Sheets-Sheet 3

Inventors:
GUSTAVE G. ERLAND and
AXEL B. PEARSON,
by: Donald G Dalton
their Attorney.

Patented Feb. 19, 1952

2,586,630

UNITED STATES PATENT OFFICE 2,586,630

BOOSTER APPARATUS FOR CONVEYER DRIVES

Gustave G. Erland and Axel B. Pearson, Pittsburgh, Pa., assignors to United States Steel Company, a corporation of New Jersey Application March 21, 1949, Serial No. 82,512

10 Claims. (Cl. 198—203)

This invention relates to improved booster apparatus for initiating movement of conveyors and the like.

Heavily loaded conveyors require a large starting force to overcome inertia of the load, but once this inertia is overcome a much smaller force is sufficient to maintain movement. Consequently it is uneconomical to equip such conveyors with drive motors of sufficient size to overcome the starting inertia; instead it is preferred to employ separate boosters for this purpose.

An object of the present invention is to provide improved booster apparatus which is of simple, economical and rugged construction and is capable of initiating conveyor movement more efficiently than previous such apparatus with which we are familiar.

A further object of the invention is to provide improved booster apparatus which is operated by fluid pressure means and which on actuation engages the conveyor to furnish the initial starting force and which subsequently automatically returns to its original position.

A further object of the invention is to provide improved booster apparatus which embodies a carriage beneath a conveyor flight, retractable dogs mounted on the carriage for engaging the conveyor, and fluid pressure means which both propels the carriage and automatically projects or retracts the dogs, depending on the direction of propulsion.

In accomplishing these and other objects of the invention, we have provided improved details of structure, a preferred form of which is shown in the accompanying drawings, in which.

Figure 4:
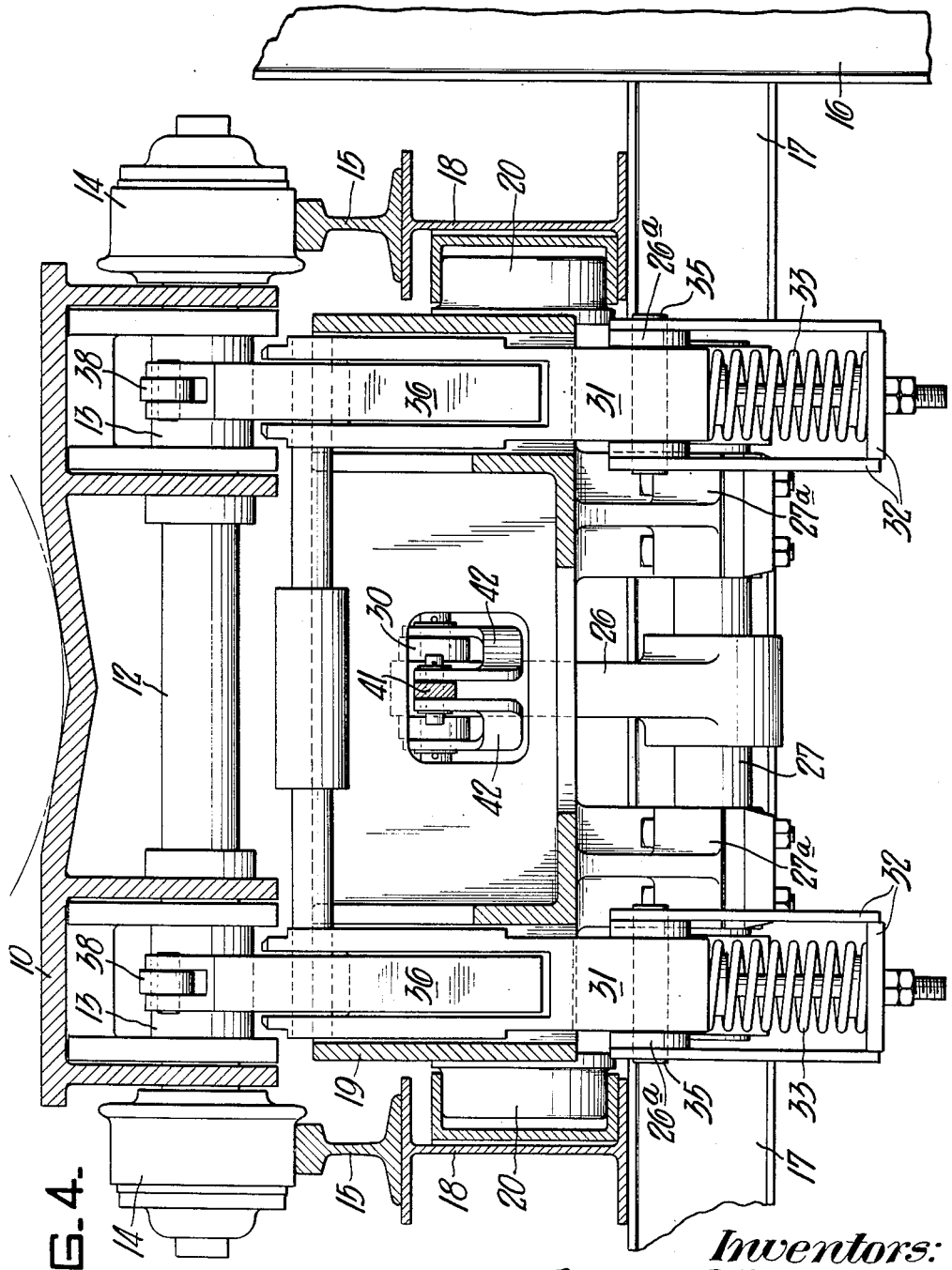
Figure 4 is a vertical cross-sectional view taken substantially on line IV—IV of Figure 3.

In the drawing there is shown an endless chain conveyor of any standard construction adapted to transport heavy loads. The particular conveyor illustrated comprises plates 10 and axles 12 to which the plates are hinged. As hereinafter explained, the booster apparatus of the present invention engages said axles. As best shown in Figure 4, thimbles 13 of hardened steel surround said axles in the regions thus engaged to reduce wear. The outer ends of the axles carry flanged wheels 14 which, along the upper flight of the conveyor, ride on a pair of rails 15 and along the lower flight on a similar pair of rails not shown. The conveyor is supported on a framework which comprises upright posts 16, horizontal cross beams 17, and longitudinal beams 18 on which rails 15 are mounted. The conveyor is driven by any suitable drive means, not shown, and the upper flight carries the load and travels from left to right.

A booster apparatus constructed in accordance with the present invention is supported on the conveyor framework between the two conveyor flights. This apparatus comprises a reciprocable carriage 19 which has wheels 20 adajacent its ends. The wheels ride in trackways 21 which are carried on longitudinal beams 18 of the conveyor framework. The length of the trackways is such that the carriage can travel a sufficient distance to accelerate the conveyor to the speed at which it is driven by the drive motor.

Figure 1:
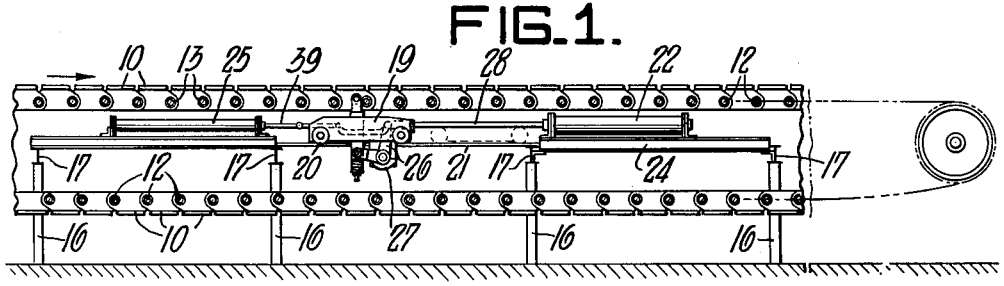
Figure 1 is a side elevational view of an endless chain conveyor equipped with an improved booster apparatus embodying features of the present invention.
Figure 2:
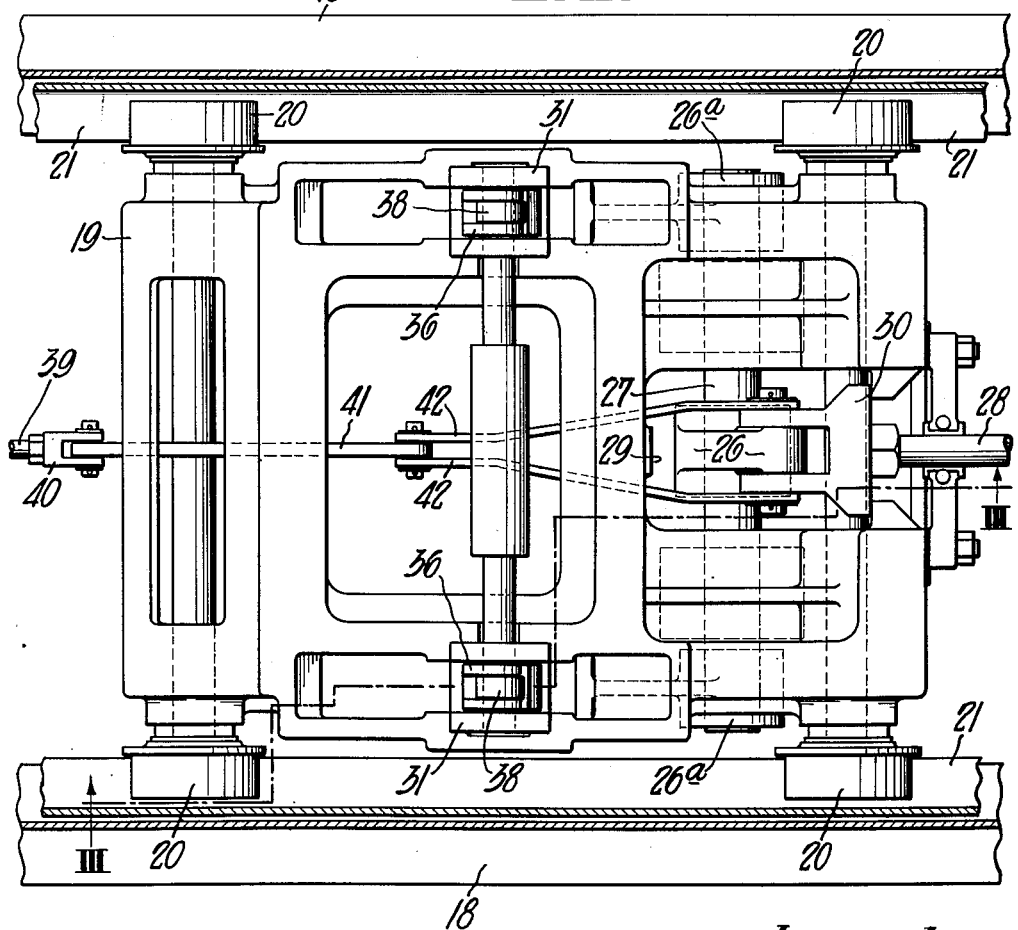
Figure 2 is a top plan view of the booster apparatus.

A main fluid pressure cylinder 22, either hydraulic or pneumatic, is supported in a stationary position on the conveyor framework between the conveyor flights forwardly or to the right of trackways 21 (Figure 1). The cylinder is shown as carried on auxiliary longitudinal beams 24 extending between one pair of cross beams 17 of the framework. A pull-back fluid pressure cylinder 25, of smaller diameter than the main cylinder and also either hydraulic or pneumatic, is supported in a stationary position on the conveyor framework between the conveyor flights rearwardly or to the left of trackways 21. The mounting means for the pull-back cylinder conveniently is similar to that for the main cylinder and hence is not described in detail.

Figure 3:
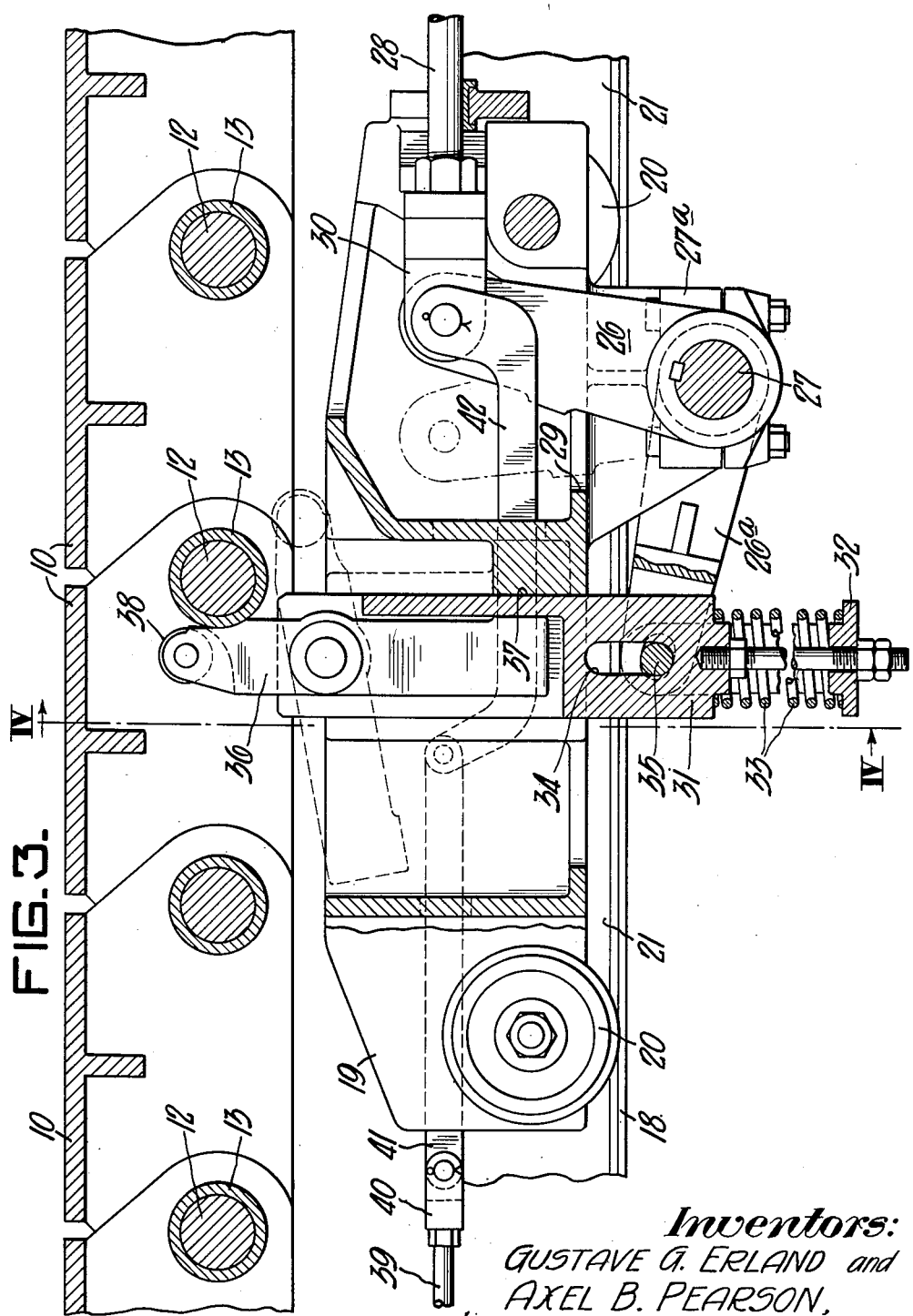
Figure 3 is a vertical longitudinal sectional view taken substantially on line III—III of Figure 2.

As best shown in Figure 3, an upright lever 26 is carried on a shaft 27 which is journaled to the underside of carriage 19 in bearings 27a. The main cylinder has a reciprocable piston to which a main piston rod 28 is joined. Lever 26 extends through a slot 29 in the carriage floor and is connected to this piston rod through a fitting 30 so that reciprocable movement of the piston rod rotates shaft 27. The connection between the fitting and the lever is sufficiently loose that it enables straight line movement of the piston rod to rotate the shaft through the necessary small arc. Rotation of the shaft is limited by engagement of lever 26 with the ends of slot 29.

A pair of vertically movable dog supports 31 are mounted adjacent opposite sides of carriage 19. The mounting means includes brackets 32, which depend below the carriage floor, and springs 33, which are interposed between the brackets and the dog supports and urge the latter upwardly. The lower end portions of said dog supports contain slot 34 and shaft 27 carries a pair of laterally extending arms 26a which have pins 35 that ride in said slots. Thus the assembly of shaft 27 and levers 26 and 26a may be considered a bell crank, which operatively connects the piston rod and the dog supports. Dogs 36 are pivoted to the dog supports and at their lower ends are adapted to abut stops 37 at the forward end of said supports so that they can pivot clockwise, but not counter-clockwise, from their upright position. The upper end of the dogs preferably carry rollers 38.

Thus it is seen that movement of piston rod 28 to the right rotates the bell crank clockwise to the limit permitted by engagement of lever 26 with the forward end of slot 29. Such rotation of the bell crank enables springs 33 to lift dog supports 31 and dogs 36 to the limit permitted by engagement of the lower ends of slots 34 with pins 35. When thus projected, the dogs are in position to engage thimbles 13 on axles 12 of the conveyor for applying a motivating force thereto. If the dogs happen to be directly underneath an axle when they are projected, rollers 38 engage the axle and pivot the dogs clockwise. The lower end portions of the dogs overbalance the dogs about their pivots so that subsequent forward movement of the carriage returns the dogs to the upright position where they can engage the next axle. After the main piston projects the dogs and the latter are in engagement with an axle, continued movement of the piston to the right pulls the conveyor and thus starts it in motion. In usual operation the conveyor drive motor starts promptly after the cylinder is actuated and takes over the driving as soon as the booster apparatus furnishes the initial acceleration.

For returning the booster apparatus to its original position and retracting the dogs, pullback cylinder 25 has a piston and piston rod 39 which are connected to lever 26 of the bell crank. The connecting means includes a fitting 40 joined to the end of the rod, a link 41 joined to said fitting, and a pair of laterally spaced links 42 joined to link 41 and to the bell crank lever. In usual operation a controlled pressure is maintained constantly in cylinder 25 and always tends to move piston rod 39 to the left. Pressure applied to cylinder 22 for moving the carriage to the right and starting the conveyor overcomes this pressure in cylinder 25. When pressure in cylinder 22 is released at the conclusion of a carriage stroke, the pressure in cylinder 25 furnishes a positive means both for returning the carriage and also for rotating the bell crank counter-clockwise and thus automatically retracting the dog supports and dogs. Thus the dogs are removed from the path of movement of the conveyor axles and do not interfere with conveyor travel. However, if an axle should happen to collide with the dogs, the latter merely pivot clockwise and there is no damage.

While we have shown separate single acting main and pull-back cylinders, it is apparent that a double acting main cylinder could accomplish similar purposes and thus the pull-back cylinder could be eliminated. Nevertheless we have found in practical installations that the two-cylinder arrangement is a more economical and efficient construction and therefore is preferred. The main cylinder is relatively large and the pullback cylinder is much smaller. It appears more economical to provide the additional small cylinder than to make the large cylinder double acting.

From the foregoing description it is seen we have provided a booster apparatus of simple and rugged construction and one which is readily adapted to start loads of any magnitude merely through use of appropriate pressures. The mechanism can be made largely automatic in its operation by use of proper control means coordinated with the conveyor drive.

While we have shown and described only a preferred embodiment of the invention, it is apparent that modifications may arise. Therefore, we do not wish to be limited to the disclosure set forth but only by the scope of the appended claims.

We claim:
1. A booster apparatus for starting conveyors and the like comprising a carriage, retractable means on said carriage adapted when projected to engage a conveyor and when retracted to clear the conveyor, means for propelling said carriage, a mechanical linkage connecting said propelling means and said retractable means for automatically projecting the latter as the carriage is propelled, and means connected to said linkage for returning said carriage to its original position and automatically retracting said retractable means as the carriage is returned, said carriage-returning means and linkage holding said retractable means in its retracted position until again projected by said propelling means.

2. A booster apparatus for starting conveyors and the like comprising a carriage, a retractable dog supported on said carriage and adapted when projected to engage a conveyor for applying a motivating force thereto and when retracted to clear the conveyor, fluid pressure means for propelling said carriage, a mechanical linkage connecting said fluid pressure means and said dog for automatically projecting the latter as said fluid pressure means commences to propel the carriage, and means connected to said linkage for returning said carriage to its original position and automatically retracting said dog at the start of the carriage return, said carriage-returning means and linkage holding said dog in its retracted position until again projected by said fluid pressure means.

3. A booster apparatus for starting conveyors and the like comprising a carriage, retractable dogs supported on said carriage and adapted when projected to engage a conveyor for applying a motivating force thereto and when retracted to clear the conveyor, a bell crank pivoted to said carriage for rotation through a limited arc and operatively connected with said dogs for projecting and retracting the latter, fluid pressure means operatively connected with said bell crank for rotating the latter and thus projecting said dogs and for propelling said carriage, and means operatively connected with said bell crank for rotating the latter back to its original position and thus retracting said dogs and for returning said carriage to its original position, said dogs remaining in their retracted position until said fluid pressure means again projects them.

4. A booster apparatus for starting conveyors and the like comprising a carriage, retractable dog supported mounted on said carriage, dogs pivoted to said dog supports and adapted when said dog supports are projected to engage a conveyor for applying a motivating force thereto, a bell crank pivoted to said carriage for rotation through a limited arc and having an arm operatively connected with said dog supports and a second arm, a stationary main fluid pressure cylinder, a main piston and piston rod mounted for reciprocable movement in said main cylinder and operatively connected with the second arm of said bell crank for rotating said bell crank and thus projecting said dog supports and for propelling said carriage, and means for returning said carriage and retracting said dog supports.

5. A booster apparatus for starting conveyors and the like comprising a carriage, retractable dog supports mounted on said carriage, dogs pivoted to said dog supports and adapted when said dog supports are projected to engage a conveyor for applying a motivating force thereto, a bell crank pivoted to said carriage for rotation through a limited arc and having an arm operatively connected with said dog supports and a second arm, a stationary main fluid pressure cylinder, a main piston and piston rod mounted for reciprocable movement in said main cylinder and operatively connected with the second arm of said bell crank for rotating said bell crank and thus projecting said dog supports and for propelling said carriage, a stationary pull-back fluid pressure cylinder, and a pull-back piston and piston rod mounted for reciprocable movement in said pull-back cylinder and operatively connected with the second arm of said bell crank for rotating said bell crank in the opposite direction from said main piston and piston rod and thus retracting said dog supports and for returning said carriage.

6. In combination with an endless chain conveyor having a supporting framework and a drive means, a booster apparatus for starting the conveyor comprising a carriage supported on the conveyor framework to travel beneath a flight of the conveyor, retractable means on said carriage, said retractable means when retracted clearing the conveyor and when projected engaging the conveyor, means for propelling said carriage, a mechanical linkage connecting said propelling means and said retractable means for automatically projecting the latter as the carriage is propelled, and means connected to said linkage for returning said carriage to its original position and automatically retracting said retractable means after the conveyor has accelerated to the speed at which it is driven by said drive means, said carriage-returning means and said linkage holding said retractable means in its retracted position until again projected by said propelling means.

7. In combination with an endless chain conveyor having a supporting framework and a drive means, a booster apparatus for starting the conveyor comprising a carriage supported on the conveyor framework to travel beneath a flight of the conveyor, a retractable dog supported on said carriage, said dog when retracted clearing the conveyor and when projected engaging the conveyor for applying a motivating force thereto, fluid pressure means for propelling said carriage, a mechanical linkage connecting said fluid pressure means and said dog for automatically projecting the latter as said fluid pressure means commences to propel the carriage, and means connected to said linkage for returning said carriage to its original position and automatically retracting said dog after the conveyor has accelerated to the speed at which it is driven by said drive means, said carriage-returning means and said linkage holding said dog in its retracted position until again projected by said fluid pressure means.

8. In combination with an endless chain conveyor having a supporting framework and a drive means, a booster apparatus for starting the conveyor comprising a carriage supported on the conveyor framework to travel beneath a flight of the conveyor, retractable dogs supported on said carriage, said dogs when retracted clearing said conveyor and when projected engaging said conveyor for applying a motivating force thereto, a bell crank pivoted to said carriage for rotation through a limited arc and operatively connected with said dogs for projecting and retracting the latter, fluid pressure means operatively connected with said bell crank for rotating the latter and thus projecting said dogs and for propelling said carriage, and means operatively connected with said bell crank for rotating the latter back to its original position and thus retracting said dogs and for returning said carriage to its original position, said dogs remaining in their retracted position until said fluid pressure means again projects them.

9. In combination with an endless chain conveyor having a supporting framework and a drive means, a booster apparatus for starting the conveyor comprising a carriage supported on the conveyor framework to travel beneath a flight of the conveyor, retractable dog supports mounted on said carriage, dogs pivoted to said dog supports and adapted when said dog supports are projected to engage the conveyor for applying a motivating force thereto, a bell crank pivoted to said carriage for rotation through a limited arc and having an arm operatively connected with said dog supports and a second arm, a main fluid pressure cylinder fixed to the conveyor framework, a main piston and piston rod mounted for reciprocable movement in said main cylinder and operatively connected with the second arm of said bell crank for rotating said bell crank and thus projecting said dog supports and for propelling said carriage and thus starting the conveyor, and means for returning said carriage and retracting said dog supports after the conveyor has been accelerated to a speed at which it can be driven by said drive means.

10. In combination with an endless chain conveyor having a supporting framework and a drive means, a booster apparatus for starting the conveyor comprising a carriage supported on the conveyor framework to travel beneath a flight of the conveyor, retractable dog supports mounted on said carriage, dogs pivoted to said dog supports and adapted when said dog supports are projected to engage the conveyor for applying a motivating force thereto, a bell crank pivoted to said carriage for rotation through a limited arc and having a laterally extending arm operatively connected with said dog supports and an upright arm, a main fluid pressure cylinder fixed to the conveyor framework, a main piston and piston rod mounted for reciprocable movement in said main cylinder and operatively connected with the upright arm of said bell crank for rotating said bell crank and thus projecting said dog supports and for propelling said carriage and thus starting the conveyor, a pull-back fluid pressure cylinder fixed to the conveyor framework, and a pull-back piston and piston rod mounted for reciprocable movement in said pull-back cylinder and operatively connected with the upright arm of said bell crank for rotating said bell crank in the opposite direction from said main piston and piston rod and thus retracting said dog supports and for returning said carriage after the conveyor has been accelerated to a speed at which it can be driven by said drive means.

GUSTAVE G. ERLAND.
AXEL B. PEARSON.

REFERENCES CITED

The following references are of record in the file of this patent:

UNITED STATES PATENTS

| Number | Name | Date |
|---|---|---|
| 1,522,116 | Gray et al. | Jan. 6, 1925 |
| 1,934,835 | Weiss | Nov. 14, 1933 |